United States Patent
Ikeda (10) Patent No.: US 7,162,086 B2
(45) Date of Patent: Jan. 9, 2007

(54) CHARACTER RECOGNITION APPARATUS AND METHOD

(75) Inventor: Hiroaki Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 784 days.

(21) Appl. No.: 10/615,304

(22) Filed: Jul. 9, 2003

(65) Prior Publication Data
US 2004/0008889 A1   Jan. 15, 2004

(30) Foreign Application Priority Data
Jul. 9, 2002   (JP)   ............... 2002-199505

(51) Int. Cl.
*G06K 9/18*   (2006.01)
(52) U.S. Cl. .................... 382/182; 382/185
(58) Field of Classification Search ............ 382/137, 382/181–182, 185, 190, 209, 218, 229, 231; 704/2
See application file for complete search history.

(56) References Cited

U.S. PATENT DOCUMENTS 5,377,280 A * 12/1994 Nakayama ............... 382/229
6,047,251 A * 4/2000 Pon et al. ..................... 704/1
6,094,484 A * 7/2000 Hall et al. .................. 380/28
6,137,905 A    10/2000 Takaoka ..................... 382/173

FOREIGN PATENT DOCUMENTS

| JP | 5-101220 | 4/1993 |
| JP | 6-301822 | 10/1994 |
| JP | 7-239913 | 9/1995 |
| JP | 9-114931 | 5/1997 |
| JP | 9-167206 | 6/1997 |

\* cited by examiner

*Primary Examiner*—Daniel Mariam
(74) *Attorney, Agent, or Firm*—Fitzpatrick, Cella, Harper & Scinto (57) ABSTRACT

A character recognition apparatus which performs character recognition with increased accuracy on a document image including plural languages. A re-recognition range is set based on the result of recognition using a first recognition unit, and character recognition by a second recognition unit is performed within the set range. In the re-recognition range, if a similarity of the result of re-recognition is higher than that by the first recognition unit, the result of recognition by the first recognition unit is replaced with the result of recognition by the second recognition unit.

12 Claims, 9 Drawing Sheets

| | |
|---|---|
| DIRECTORY INFORMATION | A0 |
| | A1 |
| FIRST DATA PROCESSING PROGRAM<br>PROGRAM CODE GROUP CORRESPONDING TO<br>STEPS OF FLOWCHART IN FIG. 2 | |
| | A2 |
| SECOND DATA PROCESSING PROGRAM<br>PROGRAM CODE GROUP CORRESPONDING TO<br>STEPS OF FLOWCHART IN FIG. 3 | |
| | A3 |
| THIRD DATA PROCESSING PROGRAM<br>PROGRAM CODE GROUP CORRESPONDING TO<br>STEPS OF FLOWCHART IN FIG. 4 | |
| | A4 |
| FOURTH DATA PROCESSING PROGRAM<br>PROGRAM CODE GROUP CORRESPONDING TO<br>STEPS OF FLOWCHART IN FIG. 5 | |
| | A5 |
| FIFTH DATA PROCESSING PROGRAM<br>PROGRAM CODE GROUP CORRESPONDING TO<br>STEPS OF FLOWCHART IN FIG. 6 | |
| | A6 |
| SIXTH DATA PROCESSING PROGRAM<br>PROGRAM CODE GROUP CORRESPONDING TO<br>STEPS OF FLOWCHART IN FIG. 7 | |
| | A7 |

FIG. 9

CHARACTER RECOGNITION APPARATUS AND METHOD

BACKGROUND OF THE INVENTION

1. Field of the Invention

The present invention relates to character recognition of optically reading an original and recognizing characters, and more particularly, to character recognition for a document image including plural languages such as a Japanese document including English words.

2. Background of the Invention

In optical character recognition apparatus (OCR apparatus), a character line is cut (character string extraction), and further, a character block is cut (character image extraction) in 1-character units by density projection (histogram). Upon cutting of character block, a density projection is taken in a character line direction, and the character line is separated based on changes of density projection value. Further, density projection is taken in a direction vertical to the character line direction in each character line, thereby each character block is extracted. Further, in a case where 1 character is separated to plural character blocks, the character blocks are combined so as to generate a final character block as 1-character unit character image, based on information including a standard character size and an estimated character pitch and the density projection in a direction vertical to the character string. If the character string cutting and character block generation are properly performed, high-accuracy character recognition is possible.

However, in a document where a first language includes a second language, character block generation cannot be properly performed in some cases. For example, in a Japanese document including English words, particularly in a Japanese document where English words are proportionally allocated, as character widths and character pitches of the English word portions are often nonuniform and greatly different from an estimated value of standard character pitch, the character block extraction is erroneously performed. In such case, the accuracy of recognition is lowered.

To attain high recognition accuracy in a Japanese document including English words, Japanese Patent Laid-Open Nos. 5-101220, 9-167206 and 6-301822 proposes the following methods.

(1) Japanese Patent Laid-Open No. 5-101220 (Prior Art 1)

A character smaller than an estimated character size is determined as a half size candidate character. In a case where there are continuous half size candidate characters and blank space exists ahead or behind the half size candidate character string, the character string is determined as an English word candidate. The size of a pair of adjacent half size candidate characters is compared with a threshold value, and if the English word candidate includes a half size candidate character determined as a non-English character, the character is excluded from the English word candidate. A half size candidate character finally determined as an English word candidate is cut out from the document image as an alphanumeric character. On the other hand, a half size candidate character determined as non-English word candidate is re-combined with its adjacent half size candidate character and the combined character is cut out.

(2) Japanese Patent Laid-Open No. 9-167206

(Prior Art 2)

Character recognition is performed on the entire document image once, then an alphanumeric character string is extracted from the result of recognition, and a pitch format is determined for each alphanumeric string. Space detection processing for proportional pitch or space detection processing for fixed pitch is applied in correspondence with pitch format, thus the space is detected with high accuracy.

(3) Japanese Patent Laid-Open No. 6-301822

(Prior Art 3)

A comparison range of character string as a single word is determined based on the positions of delimiter characters such as a blank character, a punctuation mark, parentheses and the like, and post processing for comparison with a word dictionary is performed.

However, in the prior art 1, the character block extraction processing is determining a cutting position by determination of English word candidate based on the size of a pair of adjacent half size candidate characters. In a case where contact is found between a part of characters in a proportional-pitch English word or the like, respective characters of the English word candidate cannot be separated. In this case, the English word candidate cannot be properly recognized. Further, re-recognition cannot be performed.

In the prior art 2, it is determined whether or not portions recognized as alphanumeric characters are proportional. In a case where the character recognition processing is erroneously made, even the determination of proportional is not performed on a portion not recognized as an alphanumeric character. Further, re-recognition cannot be performed.

In the prior art 3, as a word is extracted by using delimiter characters, if a delimiter has not been recognized, word comparison cannot be performed.

SUMMARY OF THE INVENTION

According to one aspect of the present invention, provided is a character recognition apparatus comprising: first recognition means appropriate to character recognition of a character image in a first language; second recognition means appropriate to character recognition of a character image in a second language; and re-recognition range setting means for setting a re-recognition range in the result of character recognition of plural character images included in a document image by using the first recognition means, for re-recognition by using the second recognition means, based on the result of recognition of an adjacent character image to a character image recognized by the first recognition means as the second language.

According to another aspect of the present invention, provided is a character recognition method comprising the steps of: performing character recognition on plural character images included in a document image, using a first recognition procedure appropriate to character recognition of a character image in a first language; setting a re-recognition range for performing re-recognition using a second recognition procedure appropriate to character recognition of a character image in a second language, based on the result of recognition of an adjacent character image to a character image recognized by the first recognition procedure as the second language; and performing re-recognition on the set re-recognition range, using the second recognition procedure.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[Character Recognition Apparatus]

Figure 1:
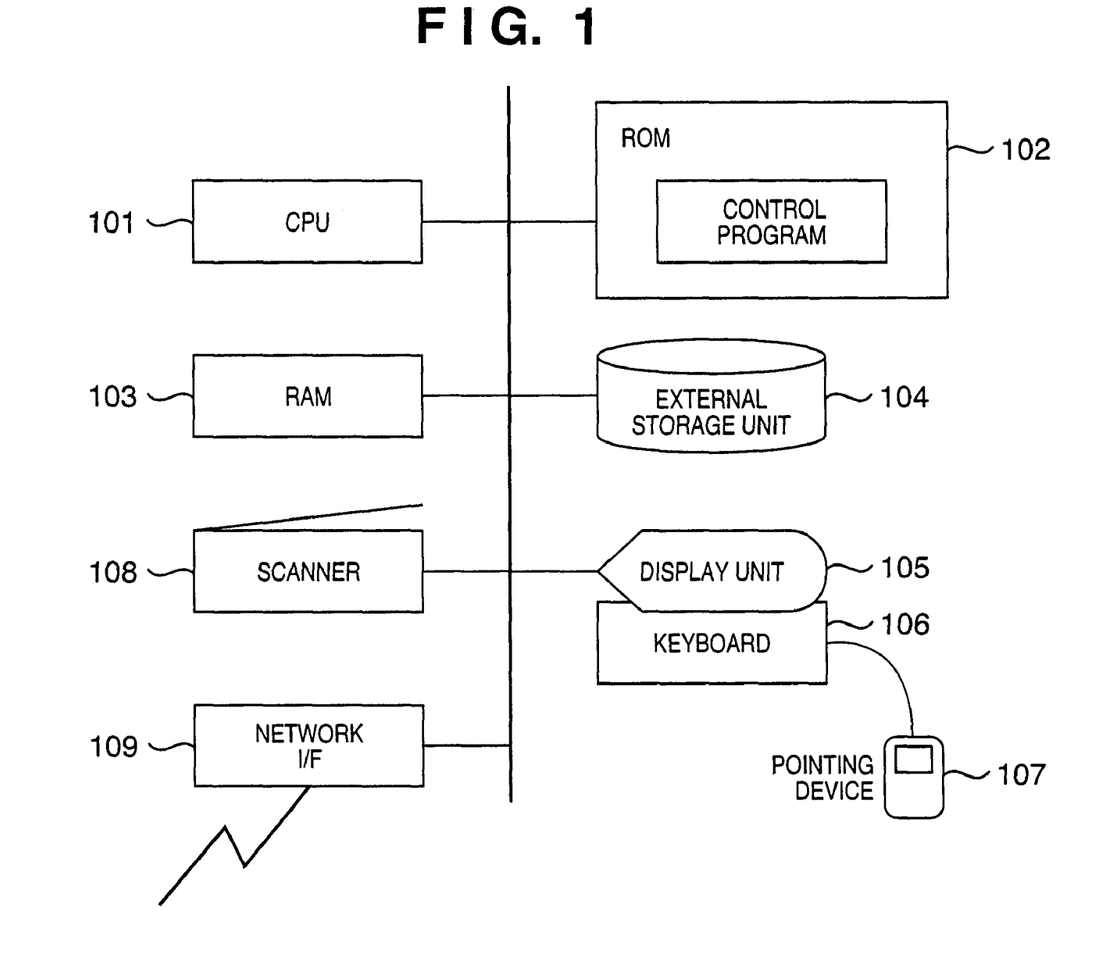
FIG. 1 is a block diagram showing a character recognition apparatus according to an embodiment of the present invention.

FIG. 1 is a block diagram showing a character recognition apparatus such as an optical character recognition apparatus (OCR apparatus) according to an embodiment of the present invention.

The character recognition apparatus, having an external storage unit 104 such as a magnet disk and an image scanner 108, reads image data of an original from the external storage device 104, or directly reads the original by the image scanner 108. The character recognition apparatus has a CPU 101 for the entire control, and a control program for the CPU 101 is stored in a ROM 102. An image inputted from the image scanner 108 is held in a RAM 103, and processing for character recognition is performed in accordance with the control program in the ROM 102. A recognition dictionary for character recognition is stored, with the control program, in the ROM 102, or read from the external storage device 104 to the RAM 103 in accordance with necessary character type.

The control program, corresponding to plural types of languages such as Japanese and English, functions as a first recognition unit and a second recognition unit appropriate to the respective languages.

Note that in accordance with necessity, preprocessing such as noise elimination is performed prior to character recognition.

In FIG. 1, reference numeral 105 denotes a display; 106, a keyboard; 107, a pointing device such as a mouse; and 109, a network interface for communication with an remote apparatus (not shown), capable of transmitting/receiving a program, a recognition dictionary, data and the like.

Next, a character recognition method performed in the character recognition apparatus will be described.

[Character Recognition Method]

Figure 2:
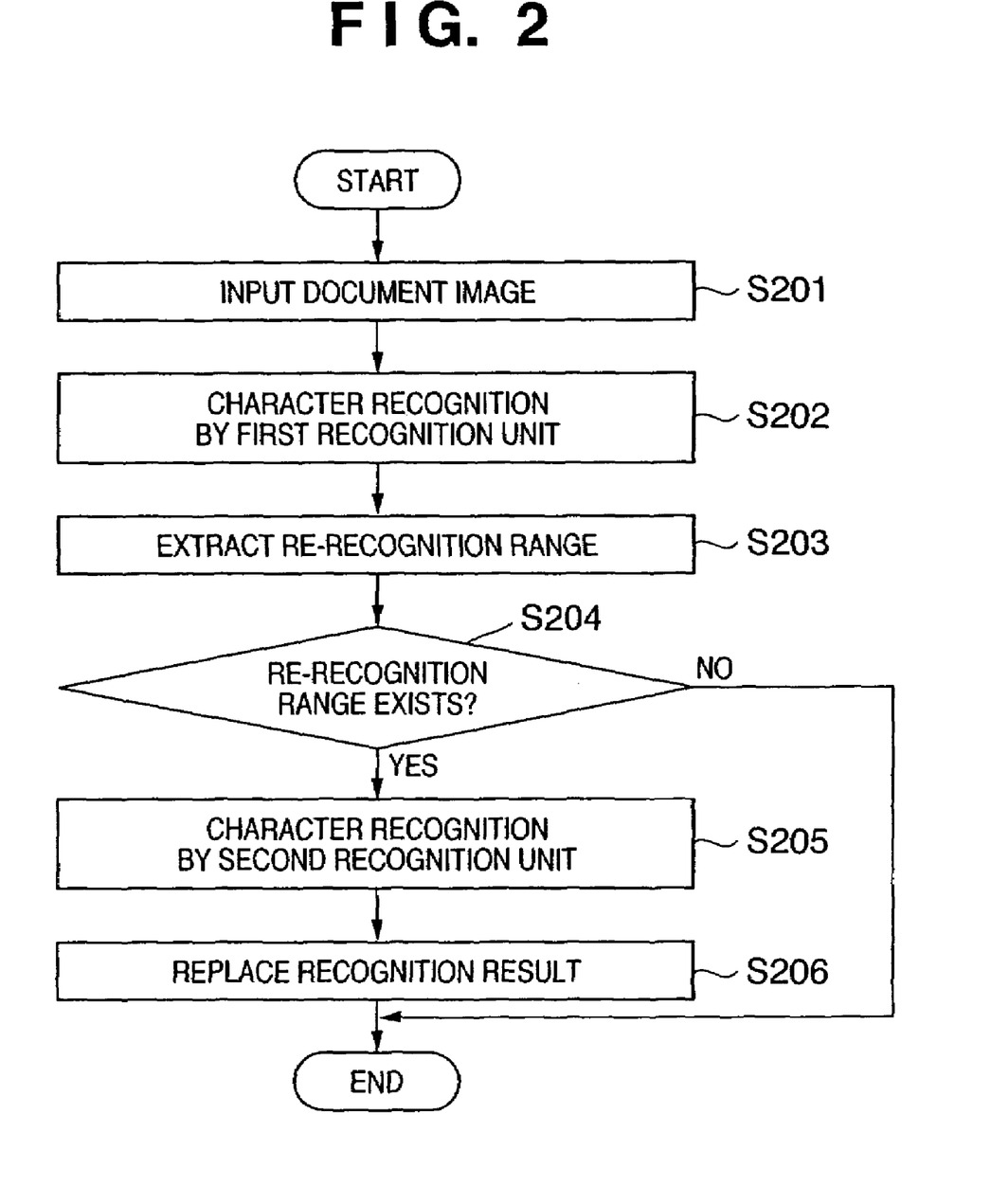
FIG. 2 is a flowchart showing a character recognition method according to a first embodiment of the present invention.
Figure 3:
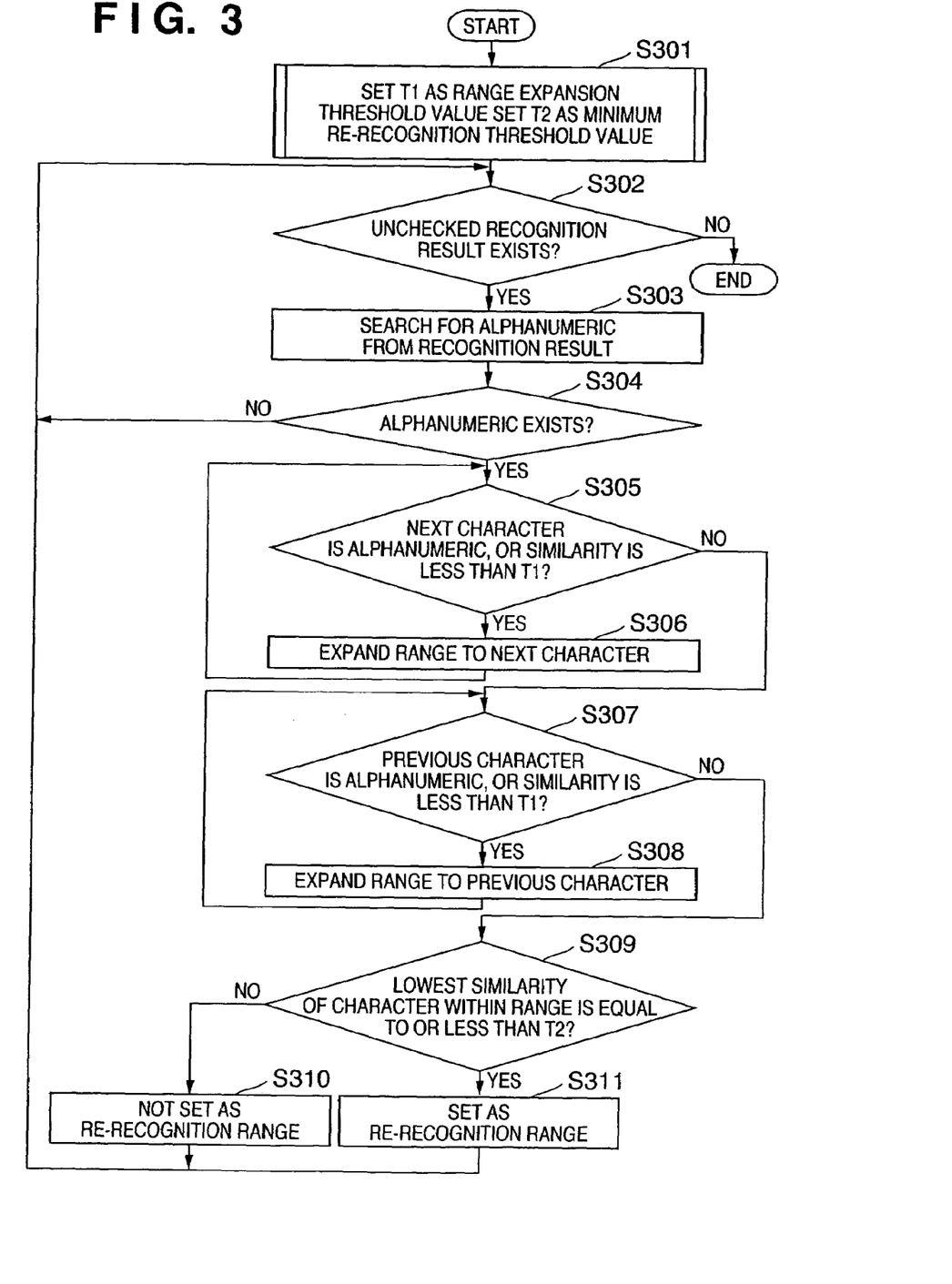
FIG. 3 is a flowchart showing processing at step S203 in FIG. 2.

FIGS. 2 and 3 are flowcharts showing the character recognition method performed by the character recognition apparatus in FIG. 1 according to a first embodiment of the present invention.

In the first embodiment, character recognition is performed by the first recognition unit appropriate to recognition of Japanese characters, then, regarding characters with low similarities resulted from the recognition, re-recognition is performed by the second recognition unit appropriate to recognition of English characters.

The flowchart of FIG. 2 shows the entire flow of the processing according to the first embodiment.

Step S201: First, an image read by the scanner 108 or stored in the external storage unit 104 is inputted, and the process proceeds to step S202.

Step S202: The input image is subjected to character recognition by the first recognition unit 1 for Japanese. Note that character block extraction is performed using a character extraction method appropriate to extraction of Japanese characters. Upon character recognition, as described in the prior art, a projection is taken in a line direction then the line is extracted, then a character block is extracted by taking a projection in a direction vertical to the line direction, then character width and character pitch are estimated using the extracted character block. In a case where 1 character is separated into plural blocks, the blocks are combined to 1 character using the estimated character width and character pitch. Thereafter, feature extraction is performed by character, and the feature is compared with previously-prepared various character type data, and a character type with the highest similarity is determined as a character recognition result. In the Japanese character recognition by the first recognition unit, a character block is extracted on the assumption that the variation in character pitch is small and a length-to-width ratio of character is approximately square. Although alphabets in standard fonts often used in Japanese documents are recognizable by the first recognition unit, however, alphabets in many other fonts are not recognizable. When the character recognition for all the characters in the image has been completed, the process proceeds to step S203.

Step S203: Regarding the recognition result at step S202, an image area including a character with a low similarity is extracted as a re-recognition range from each line. The extraction of re-recognition range will be described later. A re-recognition range is an image area within 1 line or an image area covering plural lines.

Step S204: It is determined whether or not 1 or more re-recognition ranges have been extracted at step S203. If YES, the process proceeds to step S205. If NO, the process ends.

Step S205: Character recognition is performed on the re-recognition range by the second recognition unit for English. In a case where the re-recognition range covers plural lines, a line is extracted as in the case of the first recognition unit, then a character block is extracted and a similarity is examined in character units. In a case where a re-recognition range is an image area within 1 line, a character block is extracted from the image area, and a similarity is examined in character units. As the character block extraction, a character extraction method appropriate to extraction of English characters is used.

English words may include contact between characters or an overlap (kerning). The second recognition unit, different from the first recognition unit, performs character separation on a dip portion or the like of a pixel histogram. Accordingly, characters which have not been separated by the first recognition unit can be separated. Further, a recognition dictionary is prepared for English fonts more than those for the first recognition unit. Thus, the accuracy of recognition is improved.

Step S206: As a result of re-recognition at step S205, if a higher similarity than that by the first recognition unit has been obtained, the recognition result by the first recognition unit is replaced with the recognition result by the second recognition unit in the re-recognition range. Thus English characters can be recognized with high accuracy.

According to the first embodiment, in a Japanese document including English words, the Japanese characters and English characters can be recognized with high recognition accuracy by the above processing. Further, as the second recognition unit that performs the re-recognition can operate independently of the first recognition unit, the recognition units can be replaced with other recognition units appropriate to other languages than Japanese and English. Accordingly, various combinations of languages can be handled by using the first and second recognition units.

Next, the setting of re-recognition range at step S203 will be described in more detail with reference to the flowchart of FIG. 3.

Step S301: Threshold values T1 and T2 are set, and the process proceeds to step S302. The threshold value T1 is used for determination as to whether or not the re-recognition range is to be expanded to a range including characters ahead and behind of the character block extracted by the first recognition unit. The threshold value T2 is used for determination as to whether or not re-recognition by the second recognition unit is to be performed on the set re-recognition range.

Step S302: Determination as to completion of processing at step S303 and the subsequent steps is performed. If the processing at step S303 and the subsequent steps has been completed for all the characters extracted at step S202 in FIG. 2, the process ends. If the processing at step S303 and the subsequent steps has not been completed, the process proceeds to step S303.

Step S303: It is determined whether or not an alphabet or a combination of alphabet and numeric (alphanumeric) has been detected by the first recognition unit for Japanese. If no English word is included in the Japanese document, all the characters are recognized as Japanese characters, and if English word(s) is included, alphanumeric(s) can be detected.

Step S304: It is determined whether or not an alphanumeric has been detected at step S303. If it has not been detected, the process returns to step S302, at which it is determined whether or not an unchecked recognition result exists. If an alphanumeric has been detected, the process proceeds to step S305. At steps S305 to S308, a re-recognition range is set.

Step S305: A condition to expand the re-recognition range rearward is determined. In an initial status, the re-recognition range is a range of alphanumeric detected by the first recognition unit. If a predetermined condition is satisfied, the re-recognition range is expanded to a subsequent character at step S306. As the condition to expand the re-recognition range, if a character following the re-recognition range is an alphanumeric, or if the similarity as the result of recognition of the character following the recognition range is less than the threshold value T1, the process proceeds to step S306. Otherwise, if the character following the re-recognition range does not satisfy any of the above conditions or there is no character following the re-recognition range, the process proceeds to step S307. Note that if the re-recognition range is positioned at the end of the line, the next character is the first character of the next line. If the re-recognition range is expanded to the next line, the re-recognition range covers plural lines.

Step S306: The next character of the re-recognition range is included in the range, thus the re-recognition range is expanded. Thereafter, the process returns to step S305.

Step S307: Regarding the re-recognition range, in the initial status or rearward-expanded at step S306, a condition to expand the re-recognition range frontward is determined. As the condition to expand the re-recognition range frontward, if a character preceding the re-recognition range is an alphanumeric, or if the similarity as the result of recognition of the character preceding the recognition range is less than the threshold value T1, the process proceeds to step S308. Otherwise, if the character preceding the re-recognition range does not satisfy any of the above conditions or there is no character preceding the re-recognition range, the process proceeds to step S309. Note that if the re-recognition range is positioned at the head of the line, the previous character is the last character of the previous line. If the re-recognition range is expanded to the previous line, the re-recognition range covers plural lines.

Step S308: The previous character of the re-recognition range is included in the range, thus the re-recognition range is expanded. Thereafter, the process returns to step S307.

Step S309: It is determined whether or not a character having a similarity equal to or less than the threshold value T2 exists in the re-recognition range set at steps S305 to S308. If a character having a similarity equal to or less than the threshold value T2 exists, it is determined that there is a problem in reliability of recognition result by the first recognition unit, and the process proceeds to step S311. If there is no character having a similarity equal to or less than the threshold value T2, it is determined that the characters in the re-recognition range are alphanumerics having comparatively high similarities. Since this means that the reliability of the result of recognition of the characters in the re-recognition range is high, the process proceeds to step S310. For example, in some cases, an alphanumeric written at a fixed pitch can be recognized with sufficiently high accuracy in Japanese character recognition, and the similarity is greater than the threshold value T2. On the other hand, in a case where the alphanumeric written at a variable pitch, the similarity is equal to or less than the threshold value T2, and often erroneously recognized.

Step S310: The re-recognition range, in which it has been determined at step S309 that the similarity as the result of character recognition is greater than the threshold value T2, is eliminated from the re-recognition range, and the process returns to step S302. Even in case of English word, re-recognition processing is not performed on a range with a low probability of erroneous recognition. Thus unnecessary processing can be omitted, and the entire processing speed can be increased.

Step S311: The re-recognition range, in which it is determined at step S309 that a character having a similarity as the result of character recognition equal to or less than the threshold value T2 exits, is set as the re-recognition range, and the process returns to step S302.

According to the above-described first embodiment, as the range of English word with high probability of erroneous recognition can be automatically extracted as a re-recognition range, the recognition accuracy can be increased.

The threshold values T1 and T2 may be set to previously set values using empirically obtained values, or may be set to different values according to character type or the like. For example, threshold values may be selected in accordance with character type as a result of recognition such as Hiragana (the cursive kana character), Katakana (the square form of kana), Kanji (Chinese character), alphanumeric and the like.

In the above-described first embodiment, an example of a Japanese document including English words has been described, however, even in a document in another language such as Chinese and Korean including words of different character arrangement such as English and Latin, similar advantages can be obtained.

Figure 4:
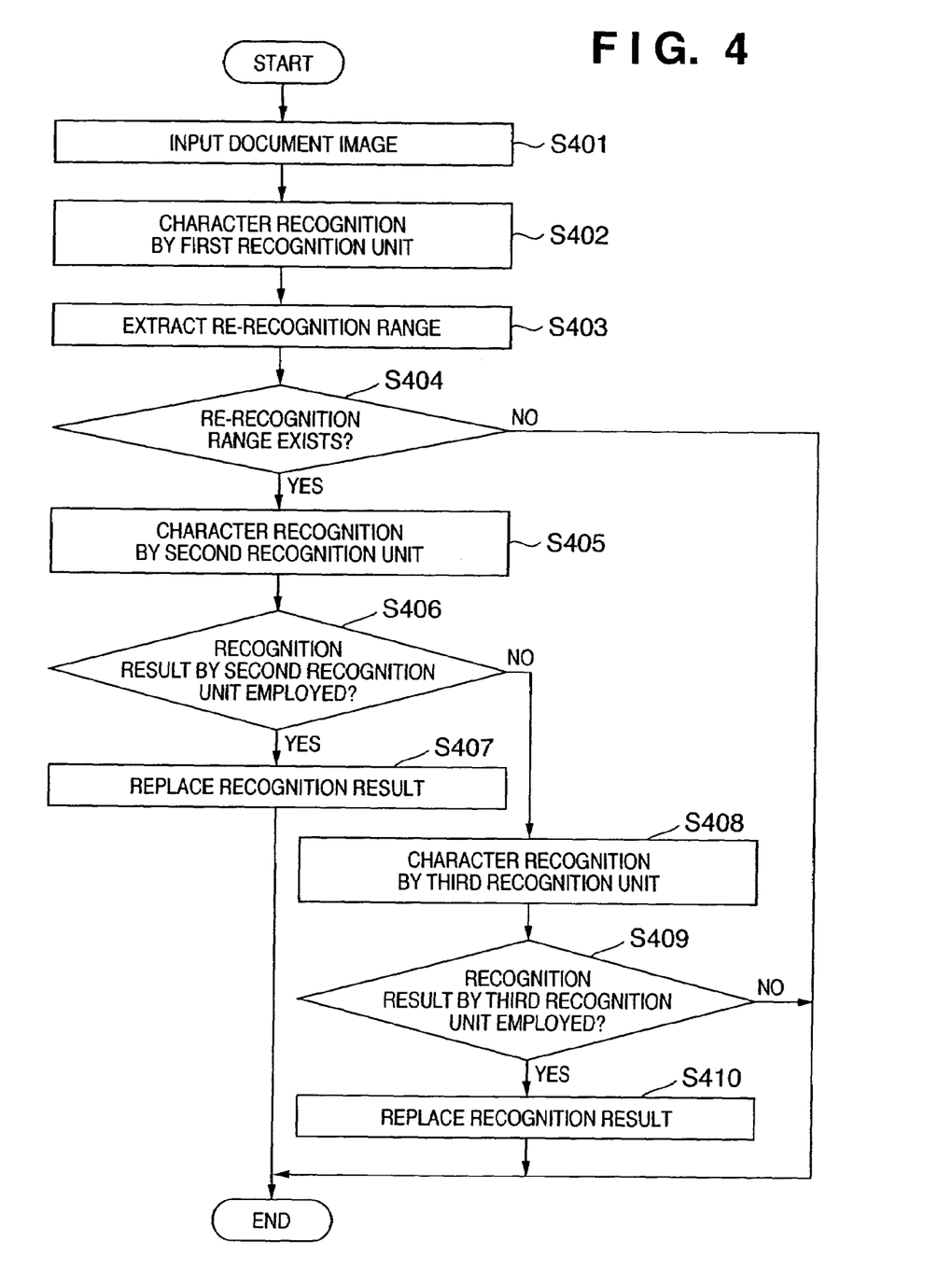
FIG. 4 is a flowchart showing the character recognition method according to a second embodiment of the present invention.
Figure 5:
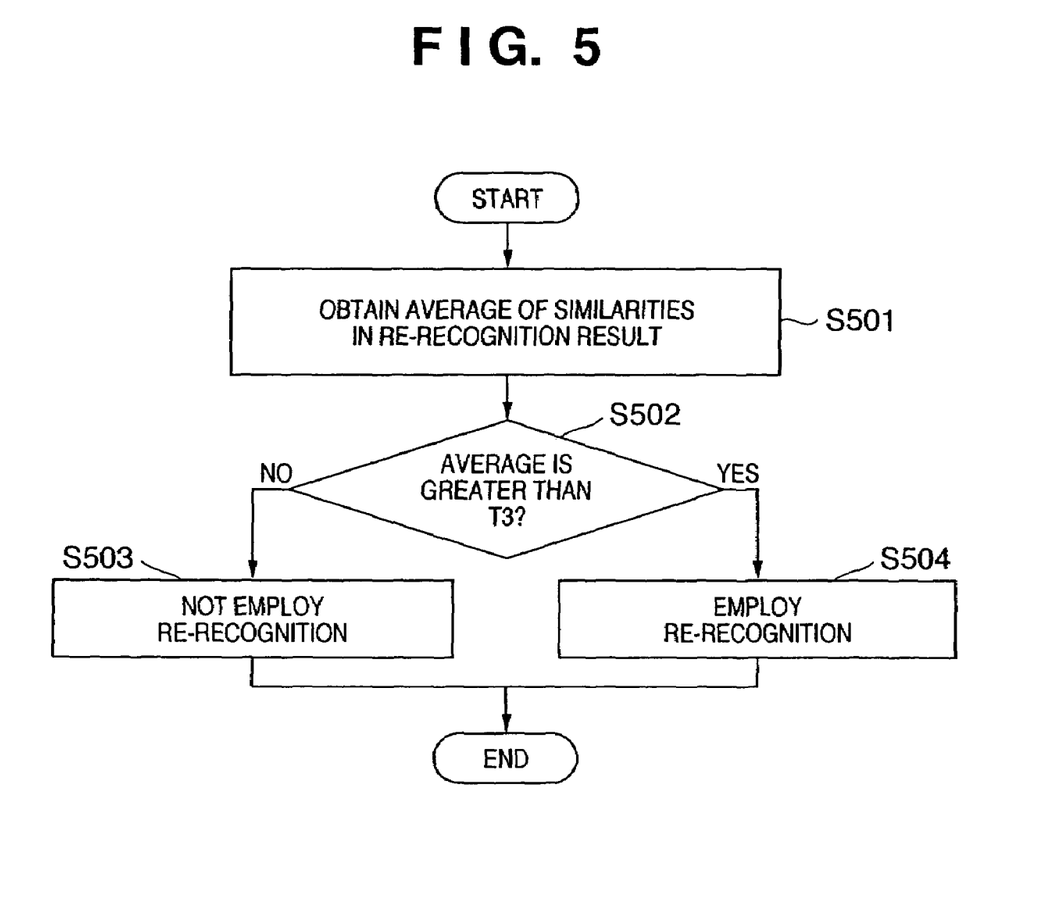
FIG. 5 is a flowchart showing an example of processing at step S406 in FIG. 4.

FIGS. 4 and 5 are flowcharts showing the character recognition method performed by the character recognition apparatus in FIG. 1 according to a second embodiment of the present invention.

In the second embodiment, re-recognition processing is performed by the second recognition unit on the result of recognition by the first recognition unit, and further, re-recognition processing by a third recognition unit is performed on the result of recognition by the second recognition unit.

The flowchart of FIG. 4 shows the entire flow of the processing according to the second embodiment.

Step S401: As in the case of step S201 in the first embodiment, an image is inputted.

Step S402: As in the case of step S202 in the first embodiment, the input image is subjected to character-recognition by the first recognition unit.

Step S403: As in the case of step S203 in the first embodiment, a re-recognition range is set.

Step S404: As in the case of step S204 in the first embodiment, it is determined whether or not 1 or more re-recognition ranges have been extracted. If a re-recognition range has been extracted, the process proceeds to step S405, while if no re-recognition range has been extracted, the process ends.

Step S405: Regarding the re-recognition range, character recognition is performed by the second recognition unit and a similarity is examined in character units. In accordance with necessity, line extraction and character block extraction are performed.

Step S406: It is determined whether or not the result of character recognition by the second recognition unit is to be employed. The method of determination will be described later. If it is determined that the result of character recognition by the second recognition unit is to be employed, the process proceeds to step S407, while if it is determined that the result of character recognition by the second recognition unit is not to be employed, the process proceeds to step S408.

Step S407: In the result of character recognition by the first recognition unit, the re-recognition range is replaced with the result of re-recognition by the second recognition unit.

Step S408: The re-recognition range is subjected to character recognition by the third recognition unit, and the process proceeds to step S409.

Step S409: It is determined whether or not the result of character recognition by the third recognition unit is to be employed. The method of determination is similar to that at step S406 and will be described later. If it is determined that the result of character recognition by the third recognition unit is to be employed, the process proceeds to step S410, while if it is determined that the result of character recognition by the third recognition unit is not to be employed, the process ends.

Step S410: In the result of character recognition by the first recognition unit, the re-recognition range is replaced with the result of re-recognition by the third recognition unit.

FIG. 5 is a flowchart showing the determination method at step S406.

Step S501: An average value is obtained from similarities as recognition results in the re-recognition range.

Step S502: The average value is compared with a predetermined threshold value T3. If the average value is equal to or less than the threshold value T3, the process proceeds to step S504.

Step S503: The result of re-recognition by the second recognition unit is not employed, but the result of recognition by the first recognition unit is employed.

Step S504: The result of recognition by the first recognition unit is replaced with the result of recognition by the second recognition unit.

Figure 6:
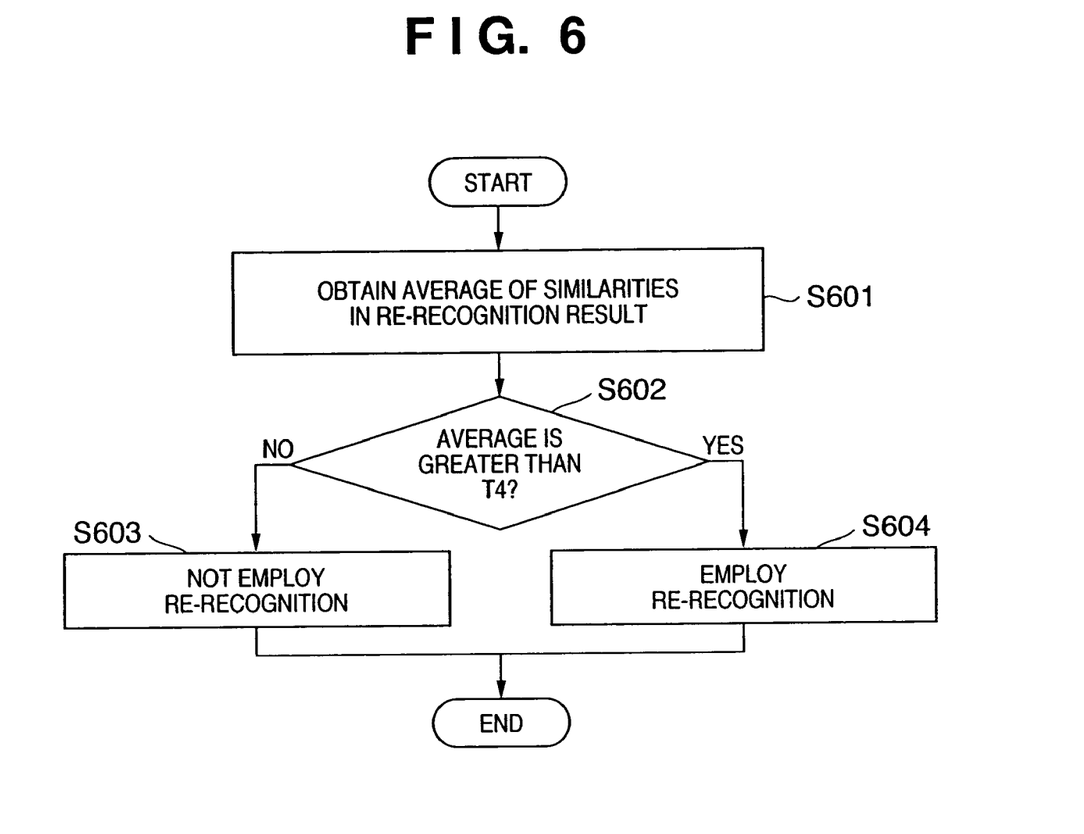
FIG. 6 is a flowchart showing an example of processing at step S409 in FIG. 4.

FIG. 6 is a flowchart showing the determination method at step S409.

Step S601: As in the case of step S501 in FIG. 5, an average value of the similarities is obtained.

Step S602: The average value is compared with a predetermined threshold value T4. If the average value is equal to or less than the threshold value T4, the process proceeds to step S503, while if the average value is greater than the threshold value T4, the process proceeds to step S604.

Step S603: The result of recognition by the third recognition unit is not employed, but the result of recognition by the first recognition unit is employed.

Step S604: The result of recognition by the first recognition unit is replaced with the result of recognition by the third recognition unit.

Note that the threshold values T3 and T4 may be the same, or may be set to different values based on empirical rules, the result of experiment or the like.

Figure 7:
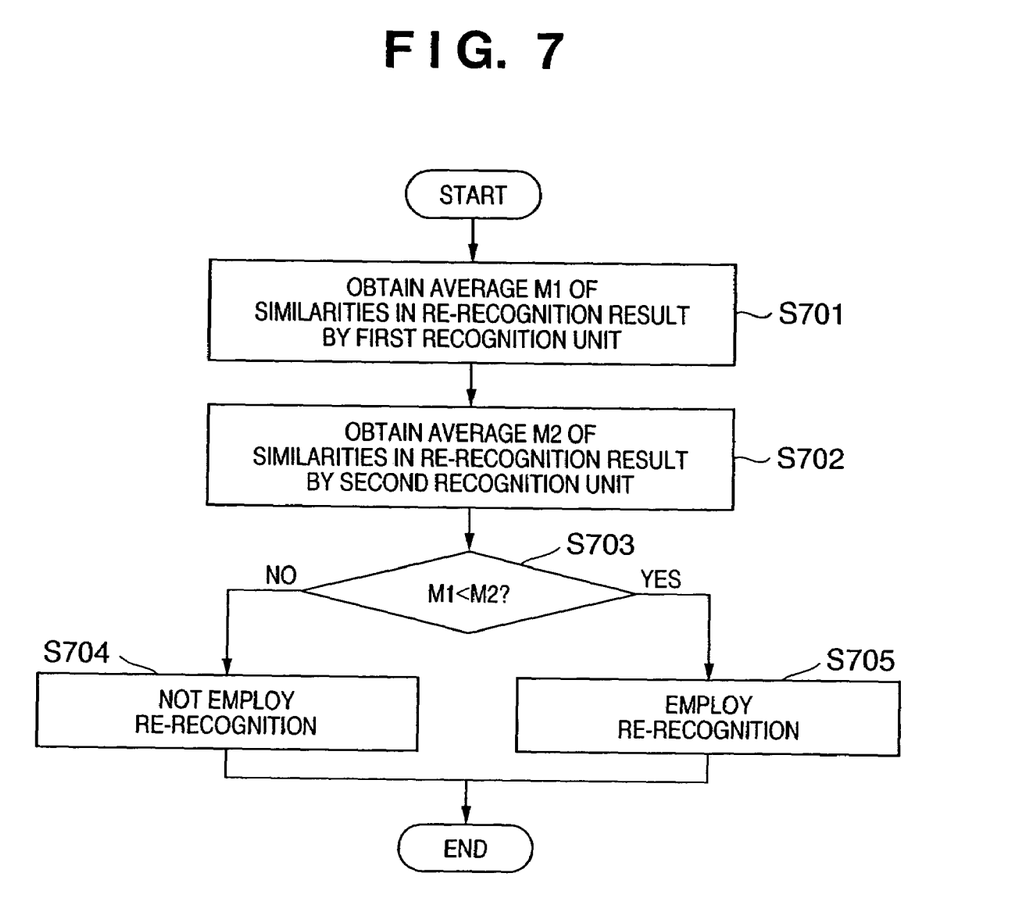
FIG. 7 is a flowchart showing an example of alternative processing to that in FIG. 5 and FIG. 6.

FIG. 7 is a flowchart showing another aspect of the determination method shown in FIG. 5.

Step S701: An average value M1 is obtained from the similarities as the results of recognition by the first recognition unit.

Step S702: An average value M2 is obtained from the similarities as the results of recognition by the second recognition unit.

Step S703: the average values M1 and M2 are compared with each other, and if the average value M1 is equal to or greater than the average value M2, the process proceeds to step S704, while if the average value M2 is greater than the average value M1, the process proceeds to step S705.

Step S704: The result of re-recognition by the second recognition unit is not employed, but the result of recognition by the first recognition unit is employed.

Step S705: The result of recognition by the first recognition unit is replaced with the result of recognition by the second recognition unit.

Note that the determination method in FIG. 7 is also applicable to comparison and selection between the recognition processing by the first recognition unit and the recognition processing by the third recognition unit.

In the second embodiment, as the reliability of recognition result is determined from the average values of similarities, the accuracy of recognition can be comprehensively evaluated. Further, as character recognition by plural recognition units are sequentially applied, and the results thereof are compared with each other, various languages and character types can be handled, and an optimum recognition result can be selected from plural recognition results.

[Program]

The control program in the character recognition apparatus in FIG. 1 includes a program to execute the first embodiment and/or a program to execute the second embodiment of the character recognition method. The program to execute the first embodiment includes modules to perform the processing at steps S201 to S206 and the processing at steps S301 to S311. The program to execute the second embodiment includes modules to perform the processing at steps S401 to S410, the processing at steps S501 to S504, the processing at steps S601 to S604, and the processing at steps S701 to S705.

[Storage Medium]

The character recognition method according to the present invention is executable by an apparatus other than the character recognition apparatus in FIG. 1 such as a general computer. In such case, it may be arranged such that the control program provided from a storage medium or the like is set in an external storage unit of the general computer, and the program is executed by a CPU or the like in accordance with a designation by an operator or the like.

Figure 8:
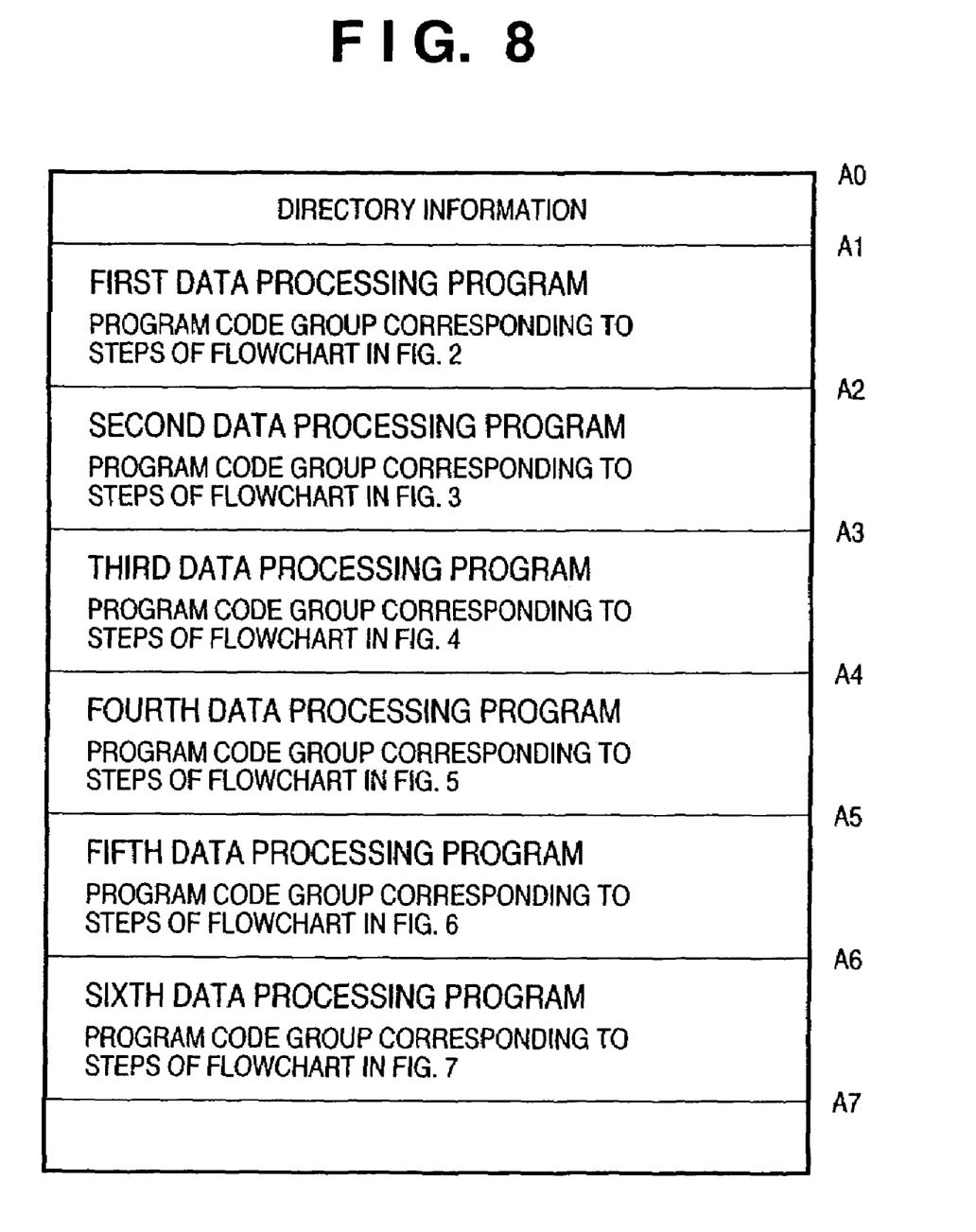
FIG. 8 is an example of a memory map in a storage medium for storing various data processing programs executed by the character recognition apparatus in FIG. 1.

FIG. 8 shows a memory map of a storage medium holding the programs to execute the first and second embodiments of the character recognition method.

In FIG. 8, directory information is stored at addresses A0 to A1. The program to execute the flowchart of FIG. 2 according to the first embodiment is stored in an area at an address following the address A1 to address A2. The program to execute the flowchart of FIG. 3 according to the first embodiment is stored in an area at an address following the address A2 to address A3. The program to execute the flowchart of FIG. 4 according to the second embodiment is stored in an area at an address following the address A3 to address A4. The program to execute the flowchart of FIG. 5 according to the second embodiment is stored in an area at an address following the address A4 to address A5. The program to execute the flowchart of FIG. 6 according to the second embodiment is stored in an area at an address following the address A5 to address A6. The program to execute the flowchart of FIG. 7 according to the second embodiment is stored in an area at an address following the address A6 to address A7.

Although not particularly shown, data belonging to the various programs may be managed as directory information and a program or the like to install the various programs to a computer may be stored in the directory information.

[Character Recognition System]

Figure 9:
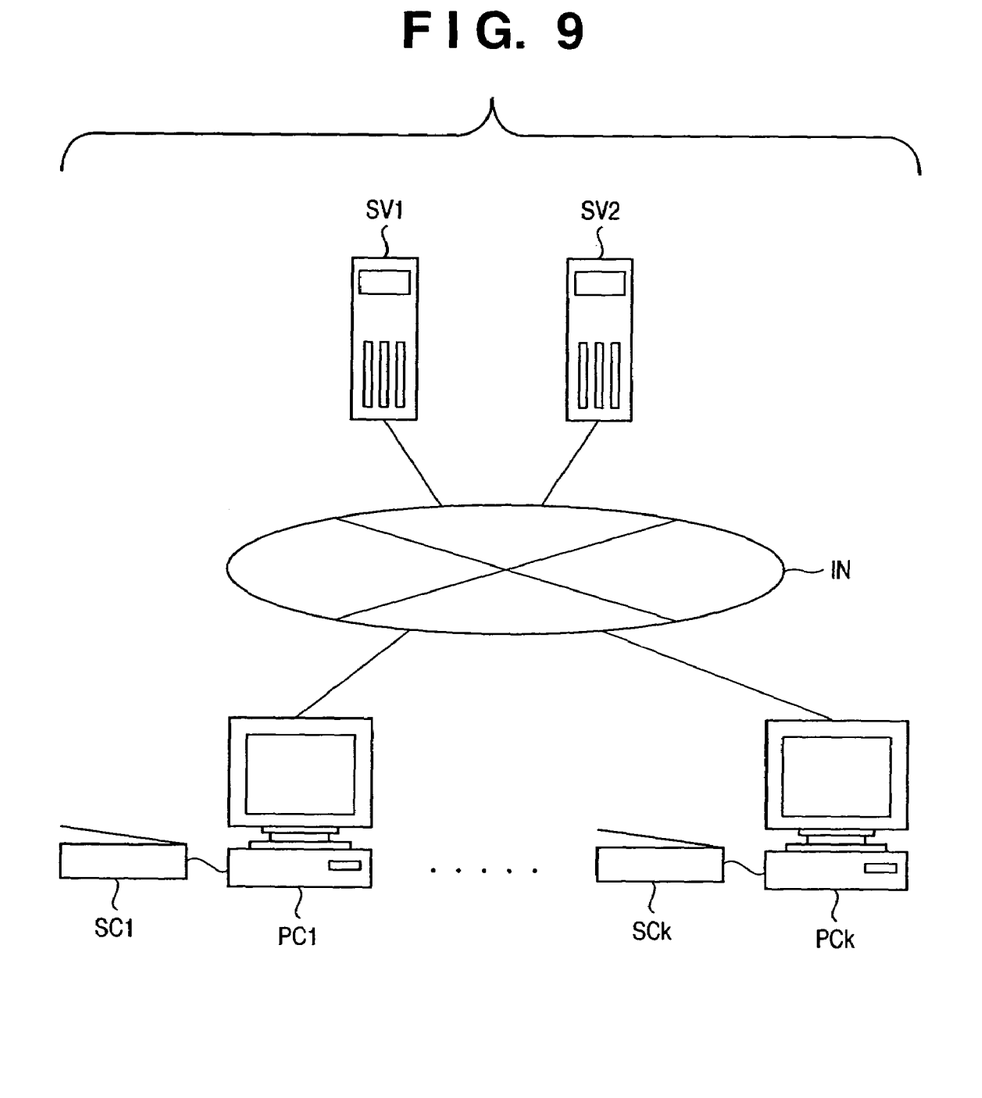
FIG. 9 is a block diagram showing an example of configuration of a character recognition system in which the character recognition method according to the present invention is performed by plural devices.

FIG. 9 is a block diagram showing an embodiment of a character recognition system to execute the character recognition method according to the present invention by plural devices.

In this embodiment, a program including a character recognition dictionary is stored in a server SV1 of an Internet service provider. The Internet service provider is connected to the Internet via communication means, plural users can utilize the character recognition program by accessing the server SV1 from the Internet.

The user operates a personal computer PC1, and transmits an image of an original document read by a scanner SC1 to the server SV1. In the server, the image of the original document as an input image is subjected to the character recognition processing according to the above-described first embodiment or the second embodiment, and the result of recognition is returned to the personal computer PC1.

Note that the recognition dictionary does not necessarily exist on the same computer that the character recognition program exists, but it may exist anywhere as long as it can be referred to via the communication means or the like. For example, it may be arranged such that the character recognition program is provided in the server SV1 and the recognition dictionary is provided in another server SV2 as separated services. In this case, a holder of the character recognition program and a holder of the recognition dictionary can hold intellectual properties i.e. the program and the dictionary, internally, and unauthorized duplication or the like can be prevented.

According to the present invention, the accuracy of character recognition of document image described in plural languages can be increased.

The present invention is not limited to the above embodiments and various changes and modifications can be made within the spirit and scope of the present invention. Therefore, to appraise the public of the scope of the present invention, the following claims are made.

What is claimed is:

1. A character recognition apparatus comprising:
   first recognition means appropriate to character recognition of a character image in a first language;
   second recognition means appropriate to character recognition of a character image in a second language; and
   re-recognition range setting means for setting a re-recognition range in the result of character recognition of plural character images included in a document image by using said first recognition means, for performing re-recognition on said set re-recognition range by using said second recognition means, based on the result of recognition of an adjacent character image to a character image recognized by said first recognition means as said second language.

2. The character recognition apparatus according to claim 1, wherein if the adjacent character image to said re-recognition range is in said second language, said re-recognition range setting means expands said re-recognition range to said adjacent character.

3. The character recognition apparatus according to claim 1, wherein if a similarity in the result of recognition of the adjacent character image to said re-recognition range by said first recognition means is equal to or less than a predetermined value, said re-recognition range setting means expands said re-recognition range to said adjacent character.

4. The character recognition apparatus according to claim 1, wherein if a similarity in the result of recognition of a character in said re-recognition range by said first recognition means is equal to or less than a predetermined value, said re-recognition range setting means determines said re-recognition range as a range for re-recognition, while if the similarity is greater than the predetermined value, said re-recognition range setting means excludes said re-recognition range from the range for re-recognition.

5. The character recognition apparatus according to claim 1, further comprising recognition result selection means for selecting the result of recognition by said first recognition means or the result of recognition by said second recognition means.

6. The character recognition apparatus according to claim 5, wherein if a similarity in the result of recognition of a character in said re-recognition range by said second recognition means is equal to or less than a predetermined value, said recognition result selection means selects the result of recognition by said first recognition means, while if said similarity is greater than the predetermined value, selects the result of recognition by said second recognition means.

7. The character recognition apparatus according to claim 5, wherein if an average value of similarities in the result of recognition of characters in said re-recognition range by said second recognition means is equal to or less than a predetermined value, said recognition result selection means selects the result of recognition by said first recognition means, while if said average value is greater than the predetermined value, selects the result of recognition by said second recognition means.

8. The character recognition apparatus according to claim 5, wherein said recognition result selection means compares an average value of similarities in the result of recognition by said first recognition means with an average value of similarities in the result of recognition by said second recognition means, and if the average value of similarities in the result of recognition by said first recognition means is equal to or less than the average value of similarities in the results of recognition by said second recognition means, said recognition result selection means selects the result of recognition by said first recognition means, while if the average value of similarities in the result of recognition by said first recognition means is greater than the average value of similarities in the result of recognition by said second recognition means, said recognition result selection means selects the result of recognition by said second recognition means.

9. The character recognition apparatus according to claim 1, further comprising:
reception means for receiving said document image from an external apparatus via a network; and
transmission means for transmitting the result of character recognition using said first recognition means, said second recognition means and said re-recognition range setting means, to said external apparatus.

10. A character recognition method comprising the steps of:
performing character recognition on plural character images included in a document image, using a first recognition procedure appropriate to character recognition of a character image in a first language;
setting a re-recognition range for performing re-recognition using a second recognition procedure appropriate to character recognition of a character image in a second language, based on the result of recognition of an adjacent character image to a character image recognized by said first recognition procedure as said second language; and
performing re-recognition on the set re-recognition range, using said second recognition procedure.

11. A programmed computer for character recognition, comprising:
a memory having at least one region for storing computer-executable program code; and
a processor for executing the program code stored in said memory,
wherein the program code includes:
code for performing character recognition on plural character images included in a document image, using a first recognition procedure appropriate to character recognition of a character image in a first language;
code for setting a re-recognition range for performing re-recognition using a second recognition procedure appropriate to character recognition of a character image in a second language, based on the result of recognition of an adjacent character image to a character image recognized by said first recognition procedure as said second language; and
code for performing re-recognition on the set re-recognition range, using said second recognition procedure.

12. A computer-readable medium having computer-executable software code stored thereon, for character recognition, the code comprising:
code for performing character recognition on plural character images included in a document image, using a first recognition procedure appropriate to character recognition of a character image in a first language;
code for setting a re-recognition range for performing re-recognition using a second recognition procedure appropriate to character recognition of a character image in a second language, based on the result of recognition of an adjacent character image to a character image recognized by said first recognition procedure as said second language; and
code for performing re-recognition on the set re-recognition range, using said second recognition procedure.

* * * * *